UNITED STATES PATENT OFFICE.

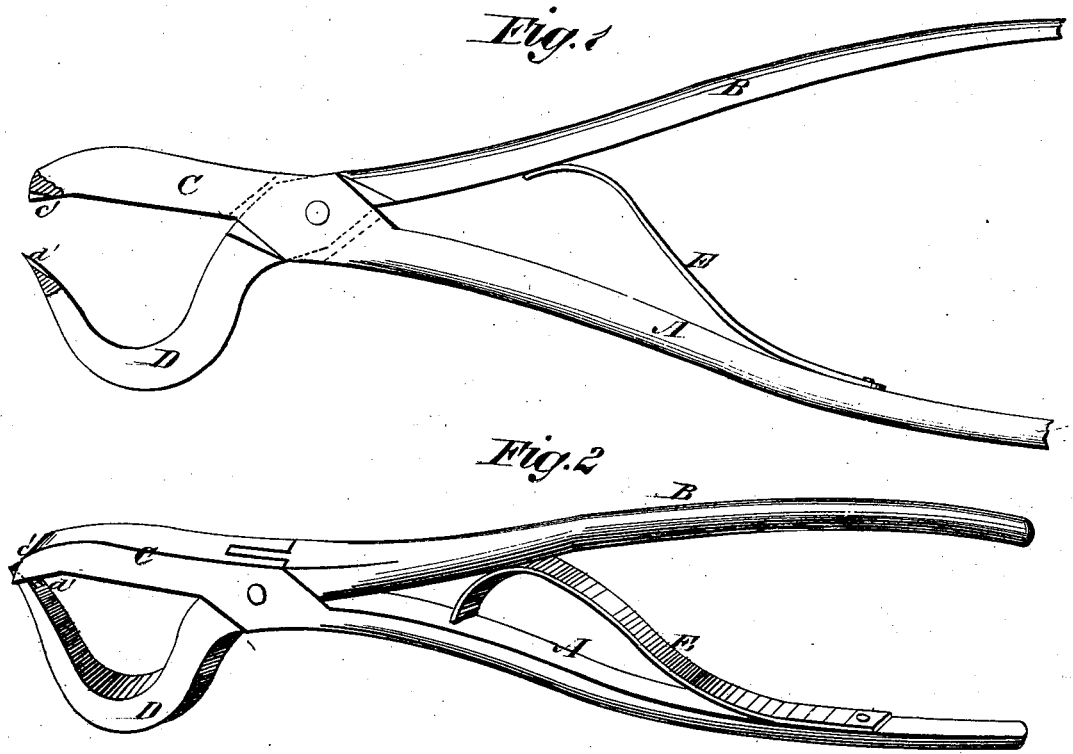

MICHEL BALTES, OF FRANKSVILLE, WISCONSIN.

IMPROVEMENT IN FARRIERS' TOOLS.

Specification forming part of Letters Patent No. 167,632, dated September 14, 1875; application filed August 14, 1875.

*To all whom it may concern:*

Be it known that I, MICHEL BALTES, of Franksville, in the county of Racine and State of Wisconsin, have invented a new and useful Improvement in Farriers' Tools, of which the following is a specification:

Figure 1 is a side view of my improved groove-cutter, part of the jaws being broken away to show the construction. Fig. 2 is a perspective view of the same.

Similar letters of reference indicate corresponding parts.

The object of this invention is to furnish an improved instrument for cutting grooves in horses' hoofs to receive the clinch of the shoe-nails, and which shall be simple in construction, convenient in use, and effective in operation, forming a groove of the proper length and size to receive the clinch, without injuring or disfiguring the hoof.

The invention consists in an improved groove-cutter formed by the combination of the handles, the straight jaw having a notch formed in the inner edge of its forward end, the curved jaw having an edge formed upon its forward end, and the spring with each other, as hereinafter fully described.

A B are the handles, which are pivoted to each other in the same way as the handles of pliers and pinchers are pivoted. Upon the forward end of the handle A is formed a jaw, C, which is made nearly straight, and has a notch, $c'$, formed in the inner edge of its forward end of such a size as to receive the part of the nail that projects from the hoof after the said nail has been driven. Upon the forward end of the other handle B is formed a jaw, D, which is curved outward and inward into U-shape, as shown in Figs. 1 and 2, and upon its end is formed an edge, $d'$. The forward end of the jaw D is made of such a size as will form a groove of the proper width to receive the clinch of the nail, and of such a length as to project into the notch $c'$, where the jaws C D are brought together. Between the handles A B is placed a spring, E, to force the handles A B apart, and open the jaws C D wide enough to form a groove of the proper length to receive the clinch.

In using the instrument the jaw C is placed against the hoof upon the upper side of the projecting part of the nail, and with the nail in the notch of the said jaw. The edge $d'$ of the jaw D is pressed against the hoof, and with an outward and downward pressure enough of the hoof will be scraped out to form a groove for the clinch.

The use of this instrument avoids the use of a rasp to form a groove for the clinch, and avoids the injurious rasping of the hoof to take out the said grooves.

When the rasp is used to form the groove it is used sidewise, and leaves a long mark. To get this mark out, the hoof has to be filed off, where the clinch is, even with the bottom of said groove, so that the groove has to be left in the hoof, disfiguring it, or the clinches have to be filed off or left projecting. When the clinches are filed off they are weakened, and are liable to become loose. When the clinches are left projecting they are liable to cut the horse's feet. By using my improved groove-cutter the clinch is left with its whole strength, and the outer surface of the hoof is left smooth.

Having thus described my invention, I claim as new and desire to secure by Letters Patent—

An improved groove-cutter, formed by the combination of the handles A B, the straight jaw C having a notch, $c'$, formed in the inner edge of its forward end, the curved jaw D having an edge, $d'$, formed upon its forward end, and the spring E with each other, substantially as herein shown and described.

MICHEL BALTES.

Witnesses:
MANN SLOGHT,
SAMUEL G. SMITH.